March 14, 1961

H. J. FLEISCHMANN 2,974,800

SYSTEM FOR HANDLING WASTE MATERIALS

Filed Jan. 30, 1957

INVENTOR.
HERBERT J. FLEISCHMANN,
BY
Allen & Allen
ATTORNEYS.

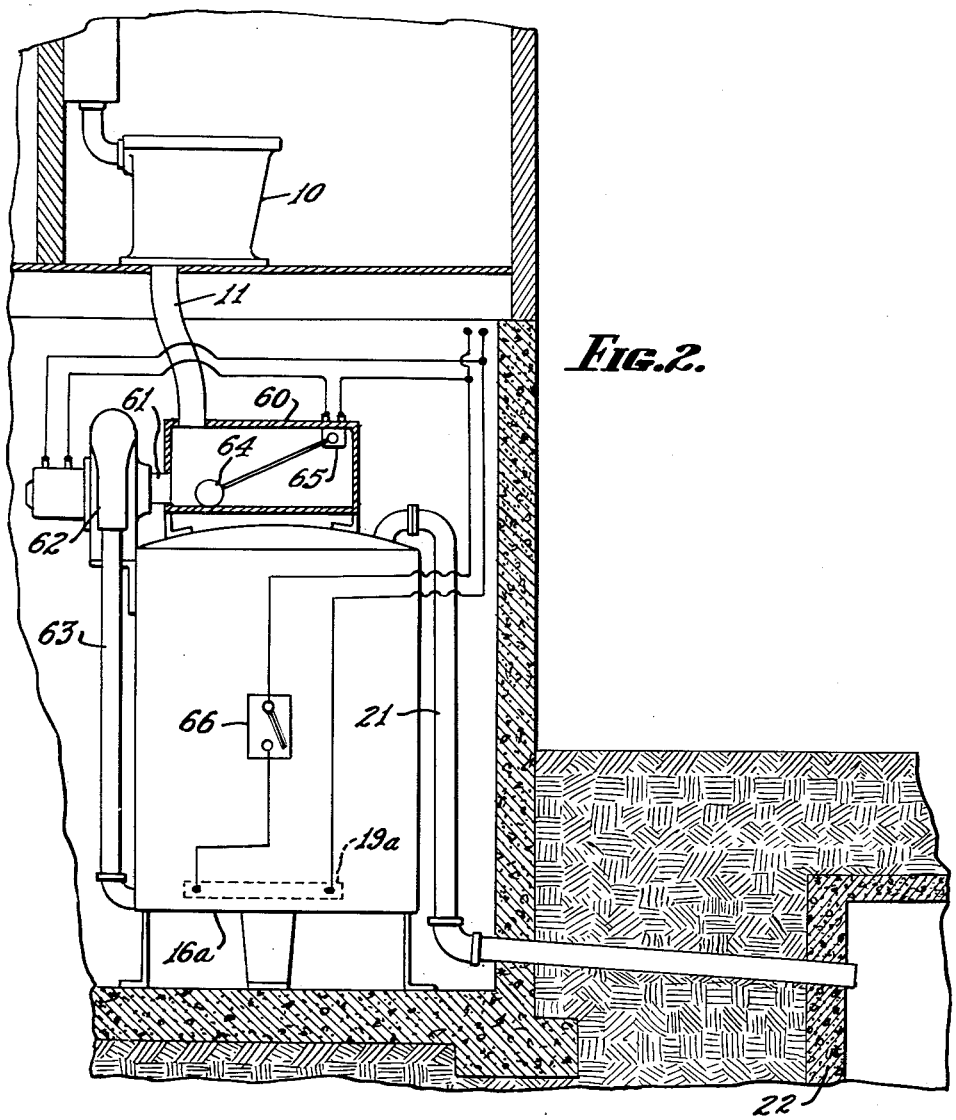

United States Patent Office 2,974,800
Patented Mar. 14, 1961

2,974,800
SYSTEM FOR HANDLING WASTE MATERIALS
Herbert J. Fleischmann, 503 E. Washington St.,
St. Louis, Mich.
Filed Jan. 30, 1957, Ser. No. 637,317
11 Claims. (Cl. 210—114)

This invention relates to the provision of a new and improved system for handling organic waste materials, particularly household waste materials, which comprises a distinct advance over the age old custom of collecting such materials in a septic tank and discharging the materials from such tank into a cesspool or the like.

It is an object of my invention to provide such a system which insures the greatest possible breaking down of the waste solids into gases and into solutions which may be easily handled.

Another object of my invention is to provide a system which will insure the utmost sanitary conditions.

Another important object of my invention is to provide a system which will insure a supply of matter which itself can be used to flush a source of waste material and at the same time initiate decomposition of such waste materials.

Another important object of my invention is to reduce the amount of waste water to be disposed. Under many soil conditions the amount of water which may be taken up by the soil is quite limited. Thus, water added to a clay soil beyond its absorptive capacity may become stagnant, percolate to the surface and reduce the comfort of people living there, and may create a health hazard.

Another important object of my invention is to reduce the cost of installation of sanitary bathroom and complete set of fixtures. Presently the cost of providing traps, vents and stacks is prohibitive for many people, and the performance of many septic tanks so poor as to be a problem even for people with sufficient means.

It is an aim of this invention to provide sanitary facilities at a reduced cost, and make rural living and living in tropical and arctic countries, with respect to sanitary conditions, comparable to city living.

Yet another important object of my invention is to provide a system for handling waste materials in which there is provided positive means for exhausting gases from all parts of such system including the source of the waste materials.

A further object of my invention is to provide a system which so effectively handles household waste materials that the final fluids may be used for irrigation purposes and even for the watering of livestock and the like.

Another object of this invention is to provide means by which various tanks employed in the system may be easily and sanitarily cleaned at periodic intervals.

A primary object of this invention is to provide means for agitating and heating the waste materials prior to discharging them into a septic tank or the like.

Other objects and advantages of my invention, including a by-pass for dilutely contaminated material such as bath water, sink drains and the like, will become apparent to the worker skilled in the art from the description to follow and from reference to the accompanying drawings in which like figures are employed to designate like parts throughout the same, and in which:

Fig. 2 is a diagrammatic representation of a simplified embodiment of my invention, illustrating the application of the essential features thereof to a household system.

Figure 1:
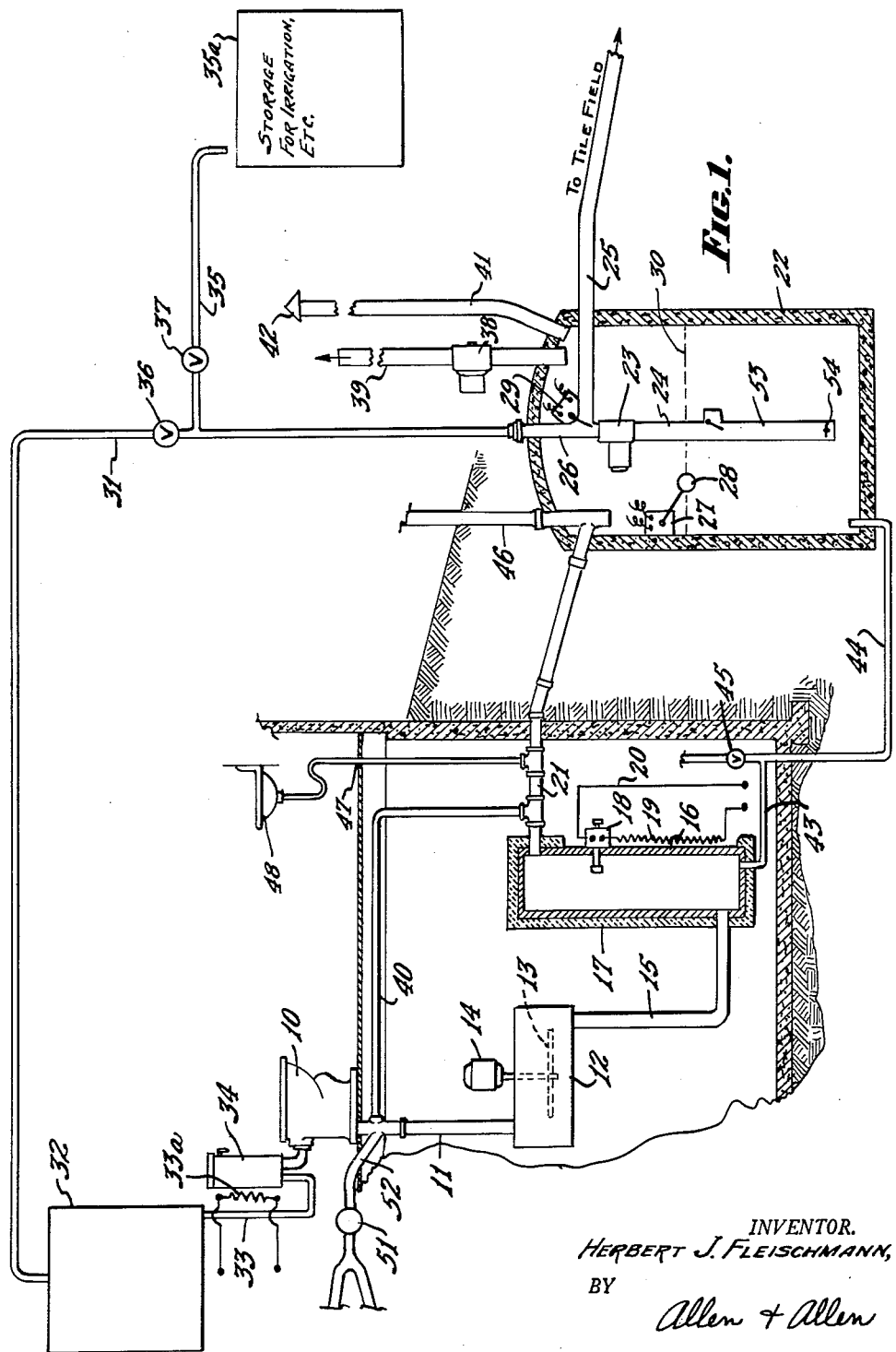
Figure 1 is largely a diagrammatic representation of the principal means employed in carrying out the invention, the relation among the various means being clearly set forth and some of the items being shown in section, and illustrating the entrance of dilute material into the closed circuit by-passing the heated chamber.

In very early times it was the custom for man to dispose of household waste materials and the like simply by dumping them into a cesspool comprising merely a deep hole in the ground, preferably in porous soil, whereby the various fluids would be disposed by percolation into the lower soil strata. Such cesspools are, wherever possible, located deep enough to prevent surface seepage, and, in some instances, the filtration rate and retention of bacteria is good enough to make such a cesspool a workable and practical system of disposal.

Population increases and more congested living conditions, however, along with the poor physical condition of the soils of certain areas, have made the general use of the old type cesspool impractical, and, indeed, unsanitary in many instances.

An improvement of the original cesspool idea was effected a number of years ago when septic tanks were introduced. In such improved system the waste materials were first collected in a septic tank before they were discharged into a cesspool or what is more commonly now called a tile field. In a septic tank certain bacterial decomposition takes place during which time a good portion of the solids are decomposed into gases like methane, carbon dioxide, hydrogen sulfide, ammonia and water with minor amounts of carbon monoxide, more complex hydrocarbons such as ethane and the like, and soluble salts.

Although it has been found that a surprising amount of such solids is decomposed in the above manner, the removal of solids is not complete and it is slow. For years, however, the accepted practice has been to discharge the waste materials into a septic tank before permitting them to flow into a cesspool or tile field. Improvements in this manner of handling such household waste materials have not been affected prior to the teachings of this invention.

Accordingly, I have discovered a system which constitutes a vast improvement of the old methods of handling waste materials just reviewed and which have been accepted for so many years.

In principle I obtain a fundamental advance over the prior art by the use of energy at one or more stages in the treatment of the sewage and aqueous waste material. By providing for the use of cheap electrical energy or other forms of energy, this system ceases to depend on the vagaries of climate, and habits of the users.

Briefly, in the practice of my invention, I have found that prior to the discharge of the waste materials into the septic tank, much improved results may be obtained if such waste materials are agitated vigorously and raised to a temperature quite a bit higher than that normally found in septic tanks and the like.

Present practice in septic tank design aims to achieve roughly a 100 hour retention period for the discharged organic waste materials. In a substantial part of this country the septic tank systems now in use operate at about 5° C. (approximately 41° F.) for a good part of the year, a thermal range not conducive to rapid bacterial action.

In my system I contemplate, for example, the use of an 80 gallon retainer, as will be more fully explained shortly, in which the agitated organic waste materials are brought to a temperature about 30° C. higher than the ground temperature of 41° F. above mentioned. The temperature preferred by me, then is about 95° F.—and higher. Probably the only real deterrent to the use of temperatures even higher than the 95° F. temperature mentioned is the expense involved. The best theoretical temperature would be that which would produce the optimum or maximum bacteriological metabolism.

I have found that best results are obtained in my system when the organic materials are retained at the elevated temperature for periods ranging from one hour to 96 hours. Thus, my system will operate effectively even though the material is retained at the elevated temperature for periods of time only one tenth, and less, as long as the 100 hour retention periods now in use at the low temperatures used in present disposal systems.

My system will, therefore, produce results in eight to ten hours which are comparable to results which it normally takes 100 hours to achieve in present systems.

In a typical arrangement of my improved system, an 80 gallon retainer or digestor, in which the waste materials will be brought to a temperature about 30° C. higher than is now prevalent in buried cesspools and retained there for periods ranging from several hours to several days, is employed. Such a retainer will adequately serve a family of four when approximately four gallons of water per flushing are employed.

By agitating and comminuting the waste materials and heating them prior to their discharge into the septic tank, I find that the final fluids withdrawn from the septic tank are surprisingly free of harmful bacteria. Furthermore, I have found that the relatively small number of bacteria carried over from the heating and treating stations is such that this fluid from the septic tank may be pumped back and used to flush the toilet through which the waste materials originally passed. Such a flushing serves to inoculate the incoming waste materials or sewage with organisms which insure immediate and high speed decomposition. It is also possible, in my system, to incorporate a constantly driven blower by which gases are continuously exhausted from the system.

A further advantage of this invention, therefore, resides in the fact that it is possible to eliminate the tile field in those localities where the disposal of bathtub water, shower wastes, sinks and wash basins in the sewers or storm sewers is permitted.

Another important advantage of my invention is that in many communities it will greatly simply the problem of control of stream pollution and the like.

Since the water used for flushing the toilet may be re-used, an initial 600 gallons of water, for example, does not increase; rather, by evaporation and leakage it actually decreases—apart from the water added in the human waste materials, which approximately makes up for the just mentioned unavoidable losses. This septic tank system, therefore, with its heated compartment or compart-ments, with its mincing machinery, with its exhaust blower or blowers, with its return pump, and with a heated flushing system, is an advance over the toilet with stacks, septic tank and tile field now so common. It will also be appreciated, as the description proceeds, that considerable operational economies are realized by the by-passing of dilute aqueous organic waste from the heated chamber. The dilute material does not require the heat provided in the chamber and is carried directly to the digestion chamber or septic tank located usually outside of the house. This, too, contributes to increased overall capacity.

Athough my invention greatly increases the decomposition of waste solids, there will still be some such solids which will not completely decompose and which will build up in the various treating tanks. These solids may be removed as is presently done by emptying the tank complements, as by opening the top and applying suction means, and carting away the accumulated solids and sludge. In my improved system, however, I find that the nature of these solids is such—and their amount so much less—that I can effectively flush these tanks by admitting water at the bottom thereof at periodic intervals, the solids being easily dispersed and readily carried out. This is emphasized when it is realized that in my system the solids are comprised chiefly of sand, phosphates and other relatively insoluble salts.

Whereas, the prior system of collecting waste materials in a septic tank and then discharging the same into a cessool is such that the discharge of the septic tank is more or less accidental in that it coincides with the time of maximum use as the incoming sewage displaces some of the old liquid, I have found that the nature of the materials collected in the septic tank following the prior treatment accorded them by my system is such that the materials from the septic tank may be positively pumped therefrom at desired intervals. In this way a relatively small and predetermined amount of liquid from the septic tank may be discharged daily at times which are most convenient, thereby avoiding peak periods in the overall sewage system. An incidental but important advantage of such an emptying schedule is that the level of the liquid in the septic tank is varied which thereby prevents many bothersome bacteria and insects from becoming there established. A water level which varies daily is a very efficient way of interrupting the breeding of mosquitoes and the like.

Referring now to Figure 1 I have indicated a toilet bowl or other refuse gathering entry at 10. A drain conduit 11 leads from this bowl to an agitating tank 12. Within this tank I provide a motor driven means such as a blade 13 by which the contents may be vigorously agitated and comminuted; the blade may be driven as by a motor 14. Within the tank 12 the material being agitated and comminuted is also aerated as will be more fully appreciated as the description proceeds.

A drain conduit 15 leads from the agitating tank 12 to the heating tank or chamber 16 which has an insulated coating 17. At 18, 19 and 20 I have diagrammatically illustrated electrical means for effectively heating the contents within the tank 16. It will be understood that any suitable means for effectively heating the contents within this tank may be employed in the practice of this invention. The unit here shown corresponds generally to an electric hot water heater of the storage type. Where intermittent or only occasional use is made of the heated chamber 16 a turbidity control is useful which has the effect of shunting out the heating unit when the circuit is not in use. Such a turbidity control may be of a photoelectric sensitivity type or based upon known electrical types and provided to operate upon the switch 18 which is normally responsive to thermal conditions within the chamber 16.

A conduit 21 leads from the upper regions of the tank 16 to a suitable septic tank 22 which will be buried in the ground. It will be observed that I have indicated that the heating tank 16 may be located within a basement or the like.

For larger households, and depending on cost of manufacture and installation, the heated compartment may be made as a section of a larger septic tank, i.e., as an integral unit of same. Also the agitating or mincing and aerating unit may be made an integral part of the septic tank and also the ventilating or forced draft unit be made an integral part of the septic tank, shipped completely assembled from the factory. This provides advantages in areas where restricting codes are in force, or the labor problems would prevent or at least endanger proper installation of the parts.

Within the septic tank 22 I provide a pump generally indicated at 23. This pump is associated with a series of conduits 24, 25 and 26. At 27 and 28 I have indicated a float control switch which will be understood has an operative connection with the control member or two way valve 29 for the pump 23. A dotted line 30 indicates the level of materials within the tank 22.

The conduit 25 leads to a tile field by which the materials of the septic tank may be finally disposed. It is pointed out that due to the treatment accorded these materials prior to the time they reach the septic tank, and including also the time such materials are permitted to stay in the septic tank, the matter finally discharged in the region of the tile field is substantially free of solids, colorless and odorless and largely free of harmful bacteria.

Also, as above indicated, in those instances wherein all sewage except that from the toilet is discharged into storm sewers and the like, the tile field may be eliminated and the treated matter simply recirculated for use in further flushing of the toilet.

The conduit 26 has an extension 31 which leads to a storage tank or auxiliary tank 32 having a connection 33 with the standard toilet closet 34. It will be understood that the arrangement of the member 29 is such that at times material from the septic tank 22 is discharged into the tile fields by way of the conduit 25 while at other times such material is discharged into the tank 32 by way of the conduits 26 and 31. As stated, the material so brought into the tank 32 contains a small amount of bacteria which are extremely helpful in initiating the decomposition of waste material. Thus, if a portion of such material is used to supplement the flushing of the toilet 10 by means of the closet 34, the rate of decomposition will be enhanced and initiated even prior to the agitating stage indicated at 12.

Thus, a substnatial saving in use of fresh water is accomplished, and also a substantial reduction in the amount of water to be disposed of is accomplished. At this stage an additional use of energy proves of great advantage. Hot water has vastly greater solvent and cleaning action than cold water, and this fact is made use of in this invention. At the same time I gain the added advantage of having the wastes at an elevated temperature suitable for rapid bacteriological decomposition from the start. This is accomplished by providing a heating element 33a for the flush valve line.

Sometimes, however, rather than discharging the material from the tank 22 into the auxiliary tank 32 or rather than discharging the material into the tile field, I simply collect such materials in storage tanks for future use in irrigation or even in the watering of livestock and the like. To this end I provide a conduit 35 and control valves 36 and 37.

Also associated with the septic tank 22 is a blower 38 by which the gases in the systems may be exhausted through the stack 39. This blower may be motor driven. Since the handling of waste materials in accordance with the teachings of this invention results in an increased amount of the solids being decomposed, there is a corresponding increase in the amount of gaseous material which must be eliminated from the system. Accordingly, I have found that a positive blower arrangement such as just indicated suits this purpose admirably. In order to effect the best control, I provide a supplemental exhaust line 40 which connects the conduits 11 and 21 in such a way as to by-pass the tanks 12 and 16. This further insures the removal of gases from the toilet 10 itself.

In addition to the positive exhaust system just reviewed, I also provide an auxiliary vent stack 41 which will be understood to incorporate a windmill attachment such as generally indicated at 42. Thus, even prolonged periods of power failure will not result in gases finding their way back into the building through the system because such gases may still effectively be withdrawn through the vent stack and windmill attachment.

Prior to this invention the installation of a bathroom having sanitary facilities has been costly because traps had to be provided. These traps serve the purpose of preventing gases from the anaerobic decomposition to enter the building. These gases are not only malodorous, but at times present a fire hazard due to their content of methane and other combustible gases. The traps, however, have to be vented, and to this end "stacks" or chimneys of sizable proportions have to be provided.

The traps and vents, to serve their purpose, have to be connected in such a way as to prevent the emptying of the traps by syphon action of the wastes flowing through them; fast and complete emptying of the wastes is desirable, but cannot easily be accomplished without emptying the traps, with the result that expensive and rather ineffective means have been employed to keep the traps filled at all times.

This invention can do away with the need for traps. By having positive suction from a power blower at the end of the sewage disposal system, fresh air is constantly drawn through all open fixtures. I also provide for an additional electric switching arrangement, whereby the power blower which ordinarily runs at much less than full capacity to assure a long service life, can for a period of say five minutes be run at near capacity. This permits use of the toilet by persons discharging malodorous discharges, because these noxious gases are drawn through the sewer line into the power blower and out of the septic tank opening. When they are discharged through the septic tank opening, these gases are so much diluted with fresh air that even in the neighborhood of the septic tank opening no nuisance is created. The constant sucking of fresh air through the sewer system prevents the creation of anaerobic conditions where they are not wanted. At the lower strata of the digestion tanks, anaerobic conditions prevail, permitting fast bacteriological and biological decomposition. In the line system, however, aerobic conditions prevail, preventing odors and explosive hazards much more directly than traps and vents. In some instances a sepaarte blower and conduit system may be utilized directly with the toilet as indicated at 51—52.

Also diagrammatically illustrated in the drawing is a system by which the septic tank 22 and heating tank 16 may conveniently be flushed at desired intervals. To this end I provide water lines extending into the bottoms of each tank, such lines being indicated at 43 and 44, a control valve being provided at 45. Since the solids remaining after treatment in my system are so finely dispersed, I find that a simple water flush obtained by admitting water into the bottoms of each tank is sufficient to cause the solids to be carried up and out with the water through the various conduits for final discharge into the tile field.

It will be understood that not all household waste materials will have to be treated in the agitating chamber and at the heating tank. Thus, for example, simple dilute waste fluids such as those which are occasioned by bathing and the like, may be passed directly into the septic tank as indicated at 46 or into one of the convenient conduits such as indicated at 21 by-passing treatment in the comminuting element 12 or the heated chamber 16; this latter feature is diagrammatically illustrated at 47 and 48.

In Figure 2 I have illustrated my invention as it might be embodied in one of its simplest nad most economical forms. Again, like numerals are employed to represent like parts. As before I have shown the wastes being led from the toilet 10 by a suitable conduit 11. These wastes may first be collected in a small tank 60.

Connected to the tank 60 by a conduit 61, for example, is a centrifugal pump 62 which not only pulls waste material from the tank 60 through the conduit 61 and pushes it down the conduit 63 but which also serves to break up the waste solids. This pump 62, therefore, corresponds in function to the apparatus 12—14 of Figure 1.

A float 64 has an electrical connection 65 in a control circuit including the pump 62. When a predetermined amount of wastes are collected in the tank 60 the float will be so moved as to actuate the pump 62 and cause such wastes to be withdrawn from the tank, broken into particles of small size and discharged through the conduit 63.

From the conduit 63 the broken up wastes are led into the tank or treating chamber 16a. This tank is shown as provided with any suitable heating element 19a which is controlled by a thermostat 66, the elements 19a and 65, of course, being connected in the same electrical control circuit.

Eventually the tank 16a will be filled, after which the introduction of additional wastes from the conduit 63 will result in discharge of heated wastes from the tank 16a by means of the conduit 21. The tank 16a is preferably so designed—according to estimated needs of the particular household—to maintain most of the wastes therein for periods of 8 to 96 hours. For a family of four, an 80 gallon tank 16a will accomplish this nicely in most cases. Tanks of various size may be supplied for different households depending on their needs and keeping the general ratio of tank size to family size as herein set forth.

In the arrangement shown the tank 16a may simply be placed in a convenient spot in the basement. Material discharged from the conduit 21 may be collected in a septic tank 22 as before. Also, if desired household wastes such as come from the bathtub and the like may by-pass the tank 60, pump 62 and heating tank 16a and be led directly to the conduit 21—or even to sewer lines if this is permitted by law.

The arrangement of Figure 2 as just described represents one of the simplest embodiments of my invention. It will be observed that the basic principles of breaking the waste solids into small size and heating the waste materials within preferred temperature ranges and for preferred lengths of time are maintained. It will be understood that, according to what the user can afford and desires, the various embellishments of the system of Figure 1 may be added to the basic arrangement of Figure 1. In this form the invention is particularly adapted to various transportation applications such as in railway cars, aircraft, motor buses, and the like replacing the present unsanitary disposal systems or the bothersome chemical units hitherto employed. The compactness of such a system and its self-sustaining closed circuit operation make it particularly desirable in such settings.

Briefly, in the operation of my system, the first and essential step of my invention is to conduct the waste materials from the toilet or waste entry 10 to the agitating chamber 12 wherein the solids are minced into micron size bacteria food. The breaking up of the solids in this manner does much to start their decomposition by bacteriological processes. In addition, however, if special conditions warrant it, I may aid such decomposition by contacting the waste materials with flush water which itself contains a small number of bacteria. This flush water is obtained from the auxiliary storage tank 32 which is connected to the closet 34 in the manner above indicated. The special conditions under which this additional step is often desirable, are when either economy in the use of water, or economy in the amount of water to be disposed of—and the maximum efficiency of a disposal system—are more important than a saving in installation cost.

The material which has had decomposition initiated in the manner just described, that is, by mincing—and by contact with other bacteria when desired—is then transferred to a tank in which it is brought to a temperature substantially above subsoil temperature. Such wastes are digested for a considerable time—at least an hour and preferably for eight hours or more, but not more than 96 hours. I have found that decomposition is very effectively enhanced at temperatures in the neighborhood of 95° to 105° F.

It should be noted that in some instances it may be desirable to accomplish agitation and heating of the materials in a common receptacle rather than in stages as indicated, and this is intended to be included within the scope of my invention.

In certain tropical countries, and after inoculation with thermophilic bacteria, a much higher temperature is desirable, and I am fully aware of the wide range of temperature advantageous in certain conditions. Briefly, the most desirable temperature is the one at which the speed of decomposition is ample for the needs of the household served, and the energy requirement for heating kept the lowest. In actual operation, then, several factors determine the most desirable temperature, but in all cases this temperature is above the subsoil temperature prevailing for most of the year in the particular temperate zone in which the teachings of this invention are applied, and usually this temperature will be at least 30° C. higher than such prevailing temperature.

After this waste material has been so treated, it is removed to a septic tank where it is permitted to collect in much the same manner as is now commonly the case. It should be pointed out, however, that the waste materials of any system, prior to their reaching the septic tank, have had at least two treatments not accorded similar materials in systems presently known to me. The material has been agitated and it has been heated. It may also have been exposed to the action of helpful bacteria.

After the material has been settled in the septic tank 22, such remaining matter may be safely discharged into tile fields, stored for irrigation or livestock watering, or used to initiate decomposition in the manner just described.

Also, in the operation of my system, it will be understood that a positive exhaust is normally maintained by means of the blower 38 located in connection with the septic tank and arranged, with means such as the auxiliary exhaust line 40, to constantly effect the removal of all gases, including even those which may be found in the region of the toilet 10 itself.

And, of course, the system may periodically be cleaned by simply flushing the finely dispersed solids with water which enters the bottoms of the tanks and which carries such materials through the tanks to the tile field eventually employed.

To accomplish this flushing action, the pump provided may be used in the following way. Normally the pump 23 is used at much less than full capacity pressure to insure long and trouble-free life. For flushing action, however, this pump is used at or near capacity. A line 53 reaches almost to the bottom of the tank and is normally closed by a valve 54. This valve is opened and the line filled with water. The pump is turned on with sufficient pressure. The syphon action of the line reaching almost to the bottom will now draw out liquid which due to the violent action of the short circuited pump brings the solids into suspension, and permits their withdrawal from the septic tank and discharge into the field. Once each year, this emptying will keep my system at top performance without expensive outside help. This tank is simple and without the disagreeable features which, in present systems, so often contribute to the failure of persons to clean the septic tank system. Present systems often fail because they are filled with solids which have not been removed as they should.

The "tile field" eventually employed may be located in a soil so poor in its water absorbing capacity that even our water saving system would lead to trouble sooner or later. Under such coil conditions, I propose to add soil conditioners at the time of the construction of the tile field which by their chemical or colloid chemical action keep the soil in a permanently porous condition. Although the price of these chemicals is not negligible, their incorporation into the tile field is a worthwhile measure as it increases the evaporation rate, and disposal of the waste water. In addition, I contemplate the planting of such plants or trees in the tile field which under the given climatic conditions evaporate a large amount of water. This measure is not meant to do away with more constructive uses of the waste water as irrigation or watering of livestock, but is meant for conditions where these constructive measures are not feasible or acceptable.

While sewage has comprised the major subject of treatment throughout the description the instant invention also encompasses the treatment of other organic household wastes in aqueous dispersion, for example, garbage and the like which are amenable to bacterial digestion.

It is to be understood that modifications may be effected in this system without departing from the scope and spirit of my contributions to the art in this field. It is also to be understood that numerous types of specific means may be incorporated in the system; for example, other types of heaters than the one shown may be used. Such departures are not to be considered as being without thte scope of this invention.

This application is a continuation-in-part of my co-pending application Serial 354,848, filed on May 13, 1953 and entitled "System for Handling Waste Materials," now abandoned.

Having thus described my invention, what I claim as new and what I desire to protect by United States Letters Patent is:

1. Apparatus for handling liquid waste materials comprising serially arranged agitating and heating means for the waste materials, a settling means, means to pass the waste material from the agitating and heating means to the settling means, means to remove portions of the waste material from the settling means, said agitating and heating means comprising a first tank having an agitator therein, said heating means comprising an insulated heated second tank, said settling means comprising a septic tank, and the means for removing portions of the treated waste material from said septic tank comprising pump means located in said septic tank and selectively delivering a portion of said treated waste for reuse.

2. A system for treating household waste materials which includes a first tank, a first conduit leading from a source of said waste materials to said first tank, means to agitate the contents of said first tank, a second tank, a second conduit leading from said first tank to the bottom of said second tank, means to heat the contents of said second tank, a septic tank, a third conduit leading from the top of said second tank to the top of said septic tank, a gas exhaust line connecting said first conduit to said third conduit and by-passing said first and second tanks, pump means in said septic tank for discharging treated waste matter therefrom, and blower means to exhaust gases from said septic tank, said third conduit and said gas exhaust line.

3. The system of claim 2 including a storage tank, a conduit extending from said pump means to said storage tank by which treated matter is pumped from said septic tank to said storage tank, and means to flush said source of waste materials with the matter in said storage tank.

4. The system of claim 2 including means to admit water into said second tank and said septic tank at the bottoms thereof to effect flushing of same.

5. The system of claim 2 including a vent stack for said septic tank and having a forced draft exhaust.

6. The system of claim 2 including control means to regulate the amount of matter that can be pumped from the septic tank.

7. In a closed circuit aqueous home sewage treating and digesting unit the combination including: organic refuse gathering conduits; a comminuting means for mincing solid refuse through which the refuse from said conduits is passed; a heated chamber having a hold-over capacity limited to the household demand receiving refuse from said comminuting means; an overflow from said heated chamber; a second chamber receiving overflow from said first chamber; means for recirculating material from said second chamber to flush said refuse gathering conduits; a by-pass gathering excess material from said second chamber above the demands of the system; and venting means from said chambers and conduits relieving collected gases.

8. In a treatment system for organic waste material and water wherein the treated effluent is recirculated for use, the closed circuit including: a receiver tank for waste material and water; means exposing said organic waste material and water to a supply of oxygen containing gas thereby assuring an oxygen environment for aerobic action in said receiver tank; an agitation structure to which said waste material and water are delivered; a heater sealed against oxygen intake through which said organic material and water is passed; a septic tank in which final anaerobic digestion occurs; and means returning water from said septic tank for recirculation in said system.

9. In an apparatus for closed circuit handling of household organic waste materials, the combination comprising: a first conduit receiving organic materials containing substantial amounts of coarse solid substances in aqueous dispersion; a comminutor through which said first conduit passes said coarse material; a heated tank receiving the discharge from said comminutor; a second tank receiving overflow from said heated tank; and a second conduit entering said second tank and carrying relatively dilute waste dispersed in water; and means leading from said second tank for removal of at least a part of the effluent therefrom for re-entrance to the system.

10. In a closed circuit aqueous home sewage treating and digesting unit the combination including: organic refuse gathering conduits; comminuting means for mincing solid refuse, through which said refuse from said conduits is passed; a heater chamber receiving said refuse from said comminuting means; an overflow from said heated chamber; a second chamber receiving overflow from said first chamber; means for recirculating material from said second chamber to flush said refuse gathering conduits; a by-pass receiving excess material from said second chamber above the demands of the system; and venting means from said chambers and conduits relieving collected gases.

11. In a closed circuit aqueous home sewage treating and digesting unit the combination including: organic refuse gathering conduits; a comminuting means for mincing solid refuse and through which the refuse from said conduits is passed; a receiving chamber into which said refuse is collected for comminution; a heated second chamber receiving comminuted refuse; a third chamber receiving overflow from said second chamber; conduit means for recirculating material from said third chamber to flush said refuse gathering conduits; a by-pass gathering excess material from said second chamber above the demands of the system; venting means from said chambers and conduits relieving collected gases; and a relatively dilute aqueous waste conductor delivering dilute aqueous waste to said third chamber.

References Cited in the file of this patent

UNITED STATES PATENTS

| | | |
|---|---|---|
| 947,333 | Hamilton | Jan. 25, 1910 |
| 1,122,155 | Pratt | Dec. 22, 1914 |
| 1,223,004 | Starr | Apr. 17, 1917 |
| 1,303,358 | Montgomery | May 13, 1919 |
| 1,331,735 | Wilson | Feb. 24, 1920 |
| 1,434,520 | Ball | Nov. 7, 1922 |
| 1,762,419 | Pettis | June 10, 1930 |
| 2,263,451 | Bach | Nov. 18, 1941 |
| 2,378,756 | Dusdin | June 19, 1945 |
| 2,432,887 | Haviland | Dec. 16, 1947 |
| 2,676,666 | Howe | Apr. 27, 1954 |
| 2,798,227 | Boester | July 9, 1957 |